United States Patent
Hesterman

(10) Patent No.: US 7,289,341 B2
(45) Date of Patent: Oct. 30, 2007

(54) POWER SUPPLY ADAPTIVE FEEDFORWARD CONTROL CIRCUIT

(75) Inventor: Bryce L. Hesterman, Fort Collins, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 74 days.

(21) Appl. No.: 11/012,511

(22) Filed: Dec. 14, 2004

(65) Prior Publication Data

US 2006/0126367 A1   Jun. 15, 2006

(51) Int. Cl.
*H02M 1/12* (2006.01)
*G05F 5/00* (2006.01)
*G05F 1/70* (2006.01)

(52) U.S. Cl. .................. 363/46; 323/299; 323/207
(58) Field of Classification Search .............. 363/46, 363/45, 44, 40, 39, 79, 41; 323/207, 299, 323/211, 222; 315/247, 308
See application file for complete search history.

(56) References Cited

U.S. PATENT DOCUMENTS

| | | | | |
|---|---|---|---|---|
| 5,237,492 A | * | 8/1993 | King | 363/46 |
| 5,359,276 A | * | 10/1994 | Mammano | 323/207 |
| 5,363,020 A | * | 11/1994 | Chen et al. | 315/209 R |
| 5,535,906 A | | 7/1996 | Drummond | |
| 5,541,833 A | | 7/1996 | Bristol et al. | |
| 5,594,323 A | * | 1/1997 | Herfurth et al. | 323/222 |
| 5,602,465 A | * | 2/1997 | Clemente | 323/300 |
| 5,668,464 A | * | 9/1997 | Krein et al. | 323/259 |
| 5,711,843 A | | 1/1998 | Jahns | |
| 6,049,473 A | * | 4/2000 | Jang et al. | 363/89 |
| 6,191,565 B1 | * | 2/2001 | Lee et al. | 323/222 |
| 6,359,799 B2 | | 3/2002 | Strand et al. | |
| 6,489,755 B1 | * | 12/2002 | Boudreaux et al. | 323/282 |
| 6,552,919 B1 | * | 4/2003 | Bors | 363/42 |
| 6,697,265 B2 | | 2/2004 | Drummond et al. | |
| 6,946,819 B2 | * | 9/2005 | Fagnani et al. | 323/207 |
| 7,038,435 B2 | * | 5/2006 | Ortiz et al. | 323/282 |

OTHER PUBLICATIONS

Barry Arbetter and Dragan Maksimovic; Feed-Forward Pulse-Width Modulators for Switching Power Converters; 1995 IEEE, pp. 601-607.

* cited by examiner

*Primary Examiner*—Gary L. Laxton
*Assistant Examiner*—Harry Behm

(57) ABSTRACT

A power supply system is disclosed. In one embodiment the power supply system includes a source of DC power that provides a DC bus voltage between a pair of DC bus terminals, and a power supply that receives power from the DC bus terminals and delivers power to a load. An output measurement circuit measures output parameters delivered by the power supply and provides a corresponding set of feedback signals. A feedback regulator connected receives the feedback signals and provides a feedback output signal operative to regulate the output of the power supply to achieve a desired voltage, current, or power level specified by a setpoint signal. An adaptive feedforward circuit connected to the feedback regulator and to the DC bus terminals provides a combined regulation signal to the power supply that minimizes perturbations in the output of the power supply due to DC bus ripple voltage.

2 Claims, 6 Drawing Sheets

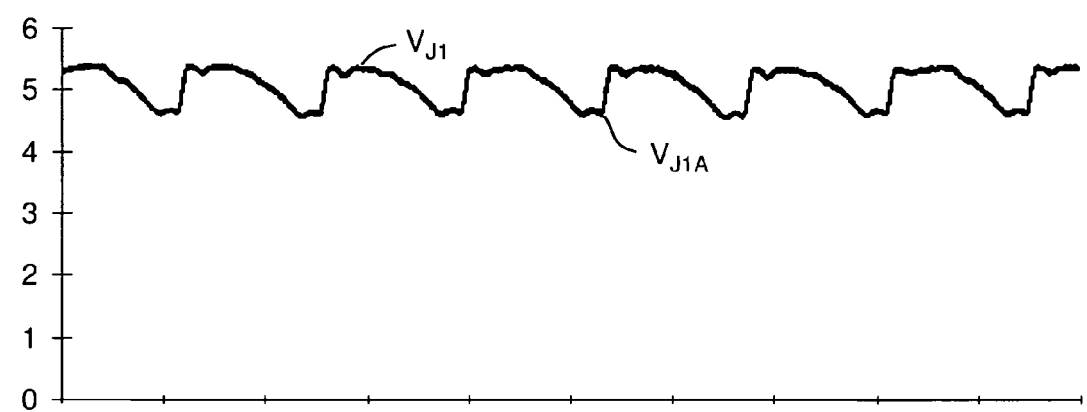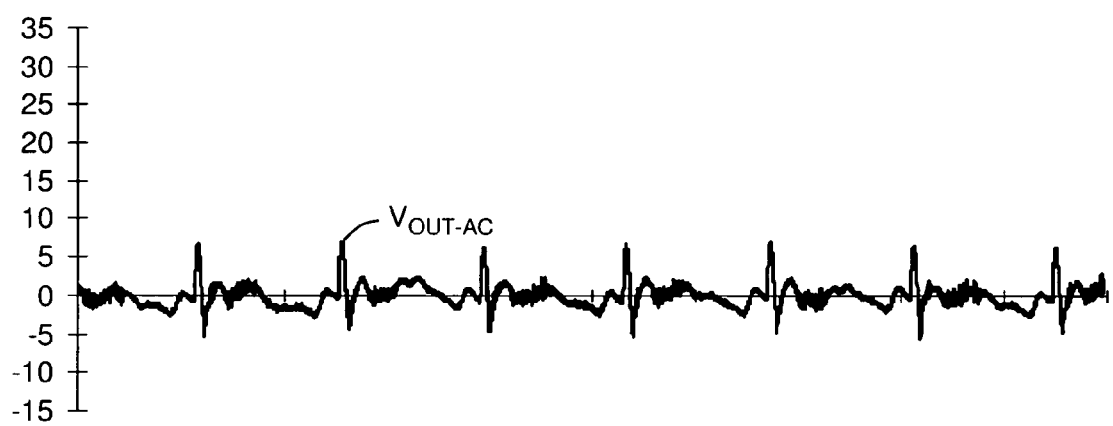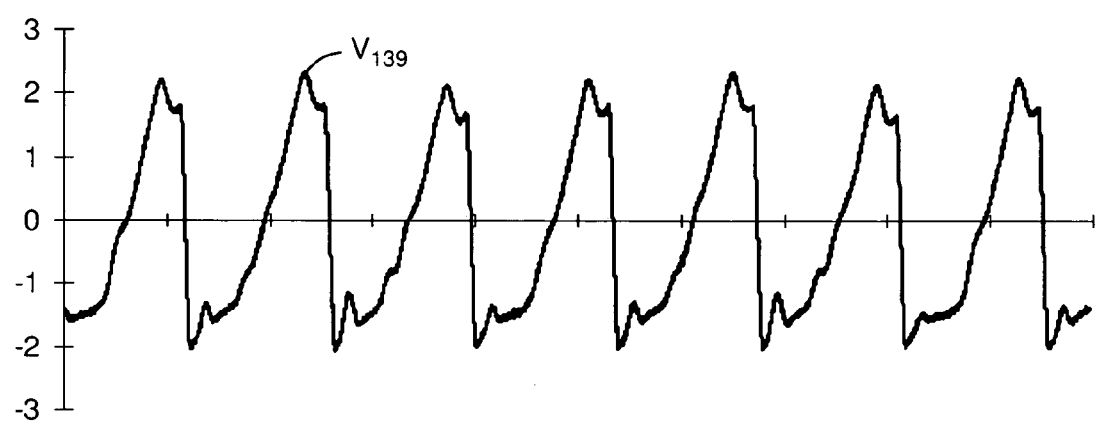
FIGURE 4

POWER SUPPLY ADAPTIVE FEEDFORWARD CONTROL CIRCUIT

BACKGROUND OF THE INVENTION

1. Field of the Invention

This invention relates generally to switch mode power supplies, and more particularly, to switch mode power supplies suitable for plasma processing that utilize feedforward control to prevent ripple and transients in the power supply output.

2. Brief Description of the Prior Art

The ability of a regulated power supply to prevent ripple and transients at the input from being transferred to the output can be improved by taking a signal proportional to the input voltage and combining it with the output from the closed-loop feedback control circuit in a way that counteracts the effect of changes in the input voltage. U.S. Pat. No. 6,359,799 discloses a three-phase power supply that uses feedforward to reduce ripple in the output. The optimal amount of a feedforward signal to be combined with the feedback signal varies with the operating conditions, and fairly elaborate control schemes such as those disclosed in U.S. Pat. Nos. 5,541,833 and 5,711,843 have been devised to adaptively adjust feedforward signals in a variety of industrial processes including plasma processing.

Feedforward techniques have been developed for use in pulse-width-modulated power supplies in which the voltage conversion ratio is determined by the switching duty cycle, such as those described in the publication by B. Arbetter, and D Maksimovic, "Feedforward pulse-width modulators for switching power converters," IEEE Power Electronics Specialists Conference, June 1995, vol. 1, pp. 601-607. However, these techniques are not applicable to resonant power supplies. U.S. Pat. No. 6,049,473 utilizes a nonlinear variable-gain amplifier to adjust the small-signal gain of the feedforward signal path according to a pre-determined trajectory, but it lacks an adaptive feedforward scaling regulator that optimizes the amplitude of a feedforward signal based on measurements of the output of the power supply.

U.S. Pat. Nos. 5,535,906 and 6,697,265 disclose frequency-controlled resonant DC power supply circuits that are suitable for use in plasma processing. In typical implementations, they receive power from a three-phase-rectified DC bus that lacks bulk energy storage capacitors. The DC bus voltage obtained from unfiltered three-phase bridge rectifiers changes rapidly near the cusps where diode commutation occurs. The bandwidth of typical control loops for these power supplies is insufficient to compensate for the rapid changes in the bus voltage that occur near the commutation cusps, and this produces ripple peaks in the output of the power supply that occur with a repetition rate of six times the line frequency. Some plasma processes such as self induced plasma copper processes require lower values of ripple in the DC power than these types of power supplies can provide. The conversion ratio of these power supplies depends on the operating conditions as well as the operating frequency, so if feedforward compensation were to be used, it would need to be adaptive in nature.

It would be desirable if there were provided a simple and inexpensive adaptive feedforward circuit that minimizes perturbations in an output of a system that delivers power to a plasma process caused by periodic perturbations in a system input.

SUMMARY OF THE INVENTION

There is provided by this invention a simple and inexpensive adaptive feedforward circuit that minimizes perturbations in an output of a system that delivers power to a plasma process caused by periodic perturbations in a system input. The preferred embodiment reduces output ripple in a power supply that receives power from a rectified three-phase DC bus by sending a combination of the output of a feedback regulator and a feedforward signal that is proportional to the AC component of the DC bus voltage. The feedforward signal is phased to the control input of a power supply to compensate for ripple and transients in the DC bus voltage. The amplitude of the feedforward signal is automatically adjusted by a feedforward scaling regulator to minimize the output ripple of the power supply.

BRIEF DESCRIPTION OF THE DRAWINGS

FIGS. 3-6 show waveforms illustrative of signals within the adaptive feedforward circuit.

DETAILED DESCRIPTION OF THE INVENTION

Figure 1:
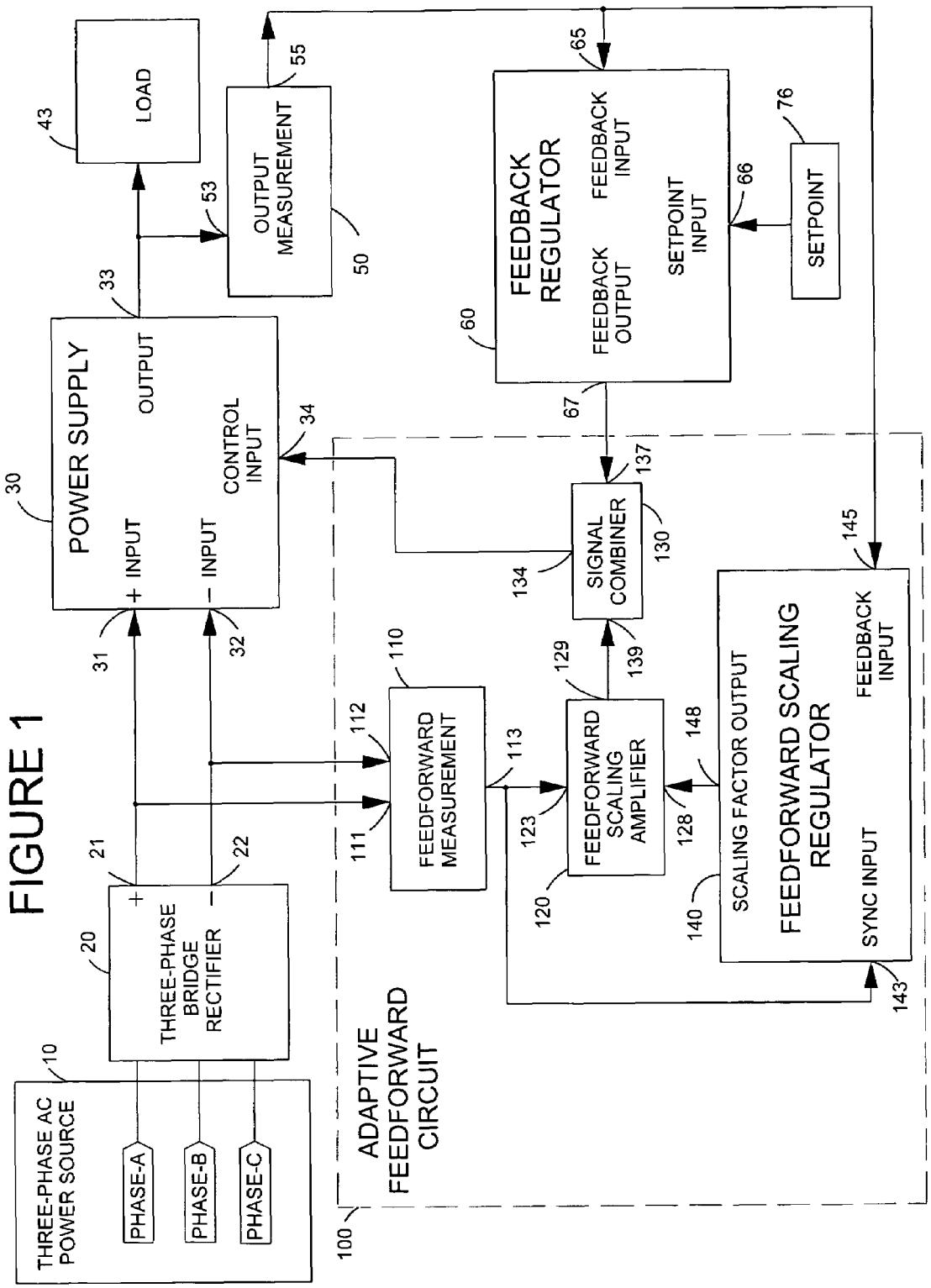
FIG. 1 is a block diagram of a three-phase power supply with an adaptive feedforward circuit.

FIG. 1 shows a block diagram of a power supply system with an adaptive feedforward circuit. A three-phase power source 10 supplies power to a three-phase bridge rectifier 20 that produces a DC bus voltage between a pair of conductors 21 and 22. A power supply 30 has a pair of DC input terminals 31 and 32 that are connected, respectively, to DC bus conductors 21 and 22. The power supply delivers power from an output 33 to a load 43. In general, power supply 30 could provide AC or DC power, depending on the application. An adaptive feedforward circuit 100 provides a scaled feedforward signal 129 that enhances the ability of a feedback regulator 60 to regulate the output of the power supply to achieve a desired voltage, current, or power level specified by a setpoint signal 76. This feedforward signal 129 diminishes perturbations of the output of the power supply due to ripple and transient voltages present across the DC bus conductors.

In operation, an output measurement circuit 50 measures a set of output parameters 53 such as the voltage, current and power delivered by power supply output 33 to load 43, and provides a corresponding set of feedback signals 55. Feedback regulator 60 has a feedback input 65 that receives a subset of feedback signal set 55 which includes some or all of the feedback signals. Adaptive feedforward circuit 100 has a feedforward scaling regulator 140 with a feedback input 145 that also receives a subset of feedback signal set 55. A feedforward measurement circuit 110 has input terminals 111 and 112 that are connected, respectively, to DC bus conductors 21 and 22, and it provides a feedforward measurement signal 113 to a feedforward input terminal 123 of a feedforward scaling amplifier 120, and to a sync input 143 of feedforward scaling regulator 140. Feedforward scaling amplifier 120 has a scaling input 128 that receives a scaling factor output signal 148 that is provided by feedforward scaling regulator 140. A signal combiner 130 receives scaled feedforward signal 129 from feedforward scaling amplifier 120 at a first combiner input 139, and also receives a feedback output signal 67 from feedback regulator 60 at a second combiner input 137. Signal combiner 130 provides a combined regulation signal 134 that is connected to a control input 34 of power supply 30.

Figure 2:
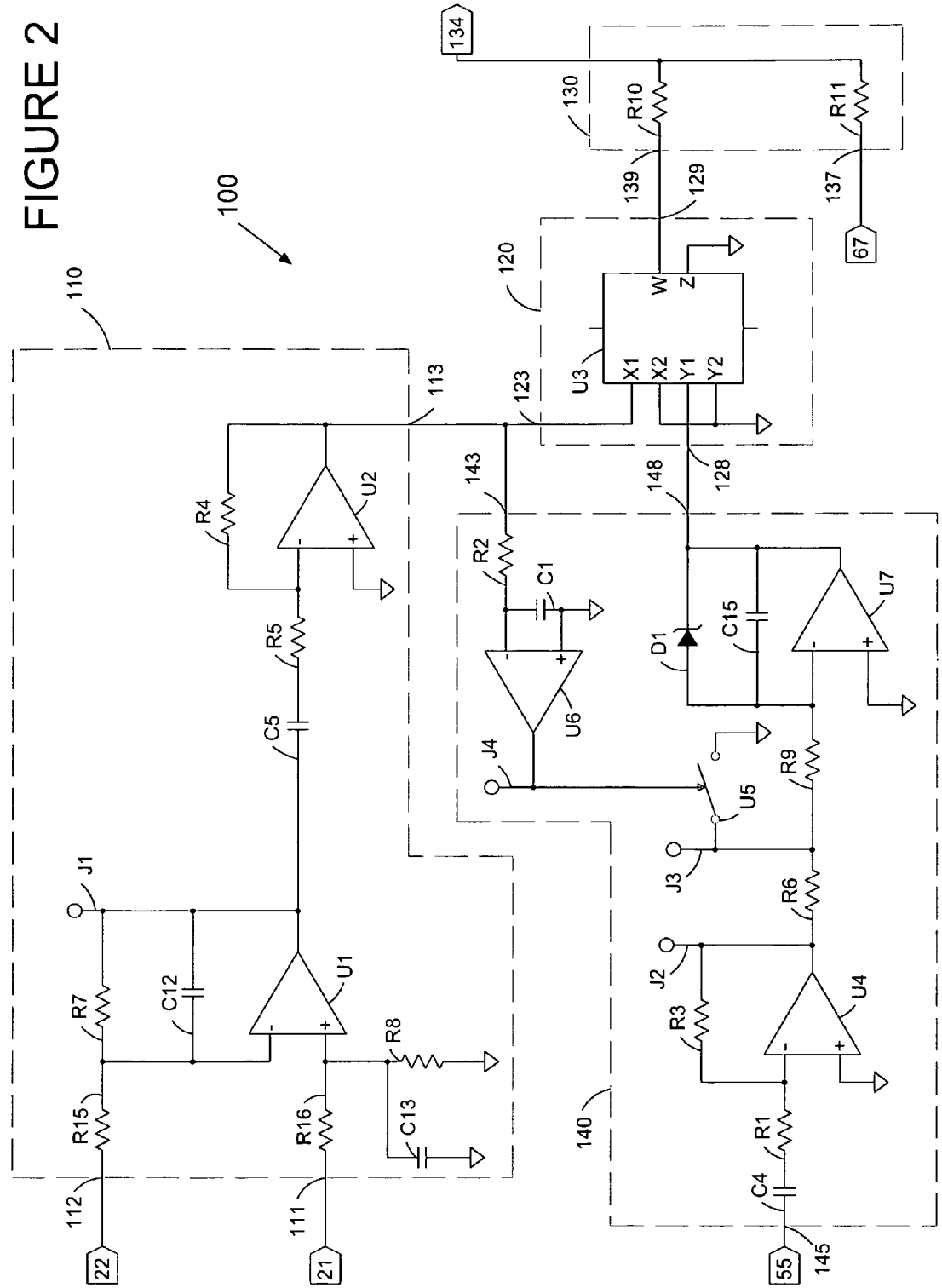
FIG. 2 is a schematic diagram of an adaptive feedforward circuit.

FIG. 2 shows a schematic diagram of adaptive feedforward circuit 100. Operational amplifier U1 and the resistors and capacitors surrounding it form a differential amplifier that measures the DC bus voltage and provides an output at junction J1. Operational amplifier U2 with resistors R4 and R5 comprise an inverting amplifier with an input that is AC coupled to the output of the differential amplifier through capacitor C5. The output of the AC-coupled inverting amplifier provides a feedforward measurement signal 113 to a feedforward scaling amplifier 120. Feedforward input 123 of the feedforward scaling amplifier 120 receives the feedforward measurement signal, and is connected to an input terminal X1 of a multiplier integrated circuit U3.

A sync input 143 of a feedforward scaling regulator 140 also receives feedforward measurement signal 113, and is connected to a low-pass noise-rejection filter comprised of a resistor R2 and a capacitor C1. The output of the low-pass filter appears across capacitor C1, and is connected to the inverting input of a comparator U6. The output of comparator U6 is connected to node J4 which provides a square-wave gating signal that is negative over a gating interval that is approximately centered on the cusps of the DC bus voltage waveform, which occur due to diode commutation in bridge rectifier 20 shown in FIG. 1, thereby synchronizing the gating interval to the periodic ripple in the DC bus voltage.

Sync input terminal 145 of the feedforward scaling regulator 140 receives a subset of feedback signal set 55. In the preferred embodiment, input 145 is connected to a signal that is proportional to the output power of power supply 30. The output power signal is preferred because a voltage signal would be attenuated with loads that have low incremental AC impedance, and a current signal would be attenuated with loads that have high incremental AC impedance.

An operational amplifier U4 and resistors R1 and R3 form an inverting amplifier having an output that is connected to junction J2, and input that is AC coupled input terminal 145 through a capacitor C4. The voltage at junction J2 is an amplified AC-coupled inverted power signal.

The control input of an analog switch U5 is connected to the gating comparator at junction J4. During the gating interval when the voltage at junction J4 is negative, analog switch U5 is turned off, and the AC-coupled inverted power signal at junction J2 flows through resistor R6, appearing as a gated power signal at a junction J3. Junction J3 is tied to ground when the gating signal at J4 is positive.

The gated power signal at junction J3 is integrated by an inverting integrator circuit that is comprised of an operational amplifier U7, an integrating capacitor C15, a Zener Diode D1 and a resistor R9. The integrator output provides scaling factor output signal 148. An input terminal Y1 of multiplier integrated circuit U3 receives the scaling factor output signal from scaling input 128 of feedforward scaling amplifier 120.

The voltage at an output W of multiplier U3 is equal to the product of the X1 and Y1 voltages divided by 10, and provides scaled feedforward signal 129. Zener Diode D1 limits the range of the integrator output voltage to prevent overdriving the Y1 input of the multiplier.

Signal combiner 130 consists of resistors R10 and R11 that are connected between combiner input terminals 137 and 139. The combined regulation signal 134 is developed at the junction where R10 and R11 that are connected to each other. This simple signal combiner produces a linear combination of input signals 129 and 67, but the signal combiner may be implemented to produce signal 134 according to any function of those input signals (e.g. multiplication) that is advantageous for a particular power supply.

Figure 3:
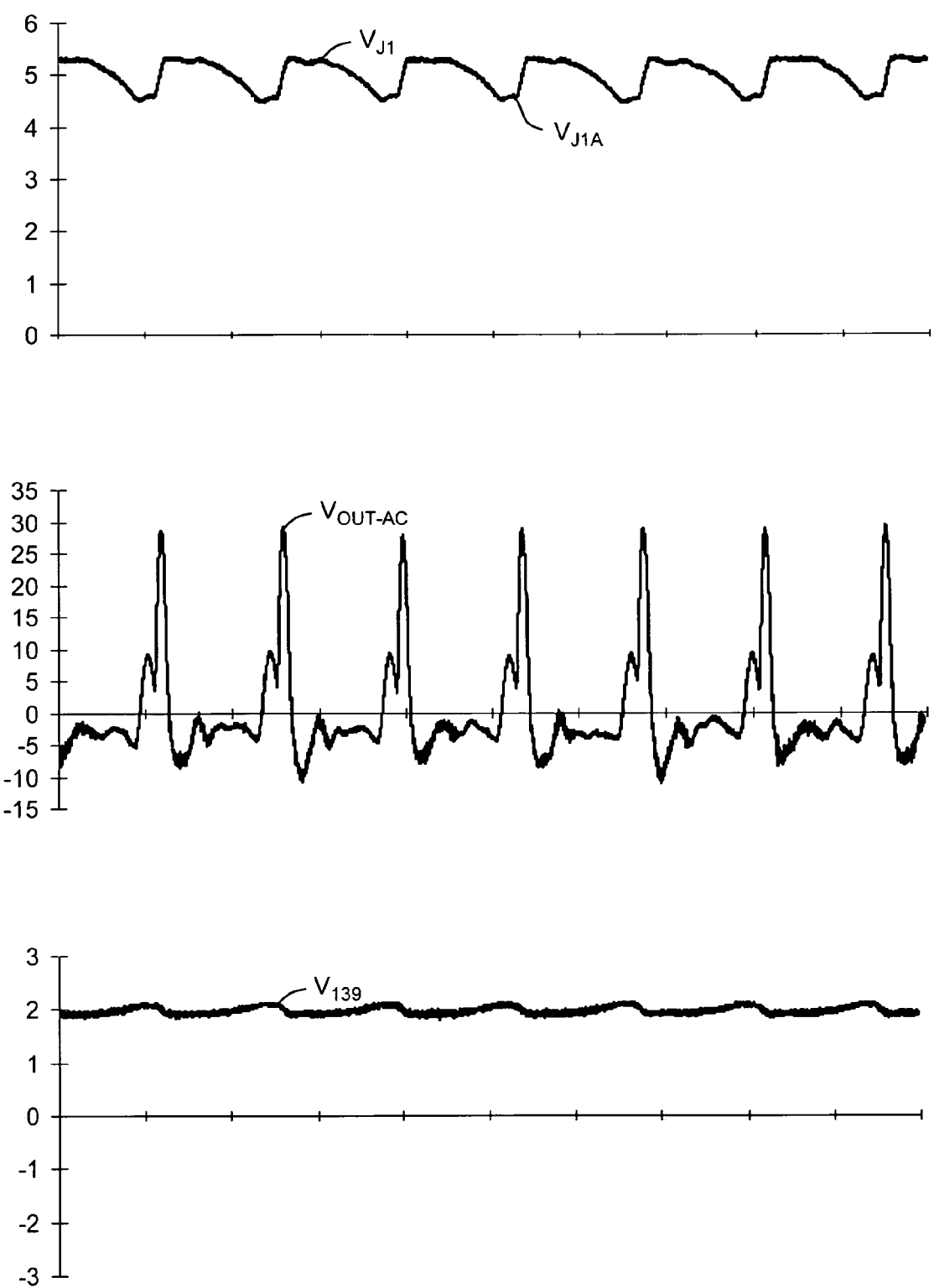

FIG. 3 shows circuit waveforms without feedforward (U3 removed), and FIG. 4 shows waveforms with feedforward (U3 installed). In FIGS. 3-6, waveform $V_{J1}$ illustrates the voltage at junction J1, waveform $V_{OUT-AC}$ illustrates an AC-coupled power supply output voltage waveform, and $V_{139}$ illustrates the voltage at input 139 of signal combiner 130. $V_{J14}$ indicates one of the cusps in the waveform of the measured DC bus voltage. The rms ripple in the DC output voltage of the power supply with the feedforward circuit is 23 percent of the rms ripple voltage without it, while the peak-peak ripple voltage with the feedforward circuit is 31 percent of the peak-peak ripple voltage without it. The output voltage of the power supply for these waveforms was 700V, and the output power was 20 kW.

From FIG. 3, it can be seen that the control circuit is unable to track the rising edge of the DC bus voltage during the interval immediately following the cusps, and this produces a spike in the DC output voltage. The feedforward signal $V_{139}$ shown in FIG. 4 falls rapidly during the time immediately following the cusp, and this compensates for the rapidly rising DC bus voltage.

Figure 5:
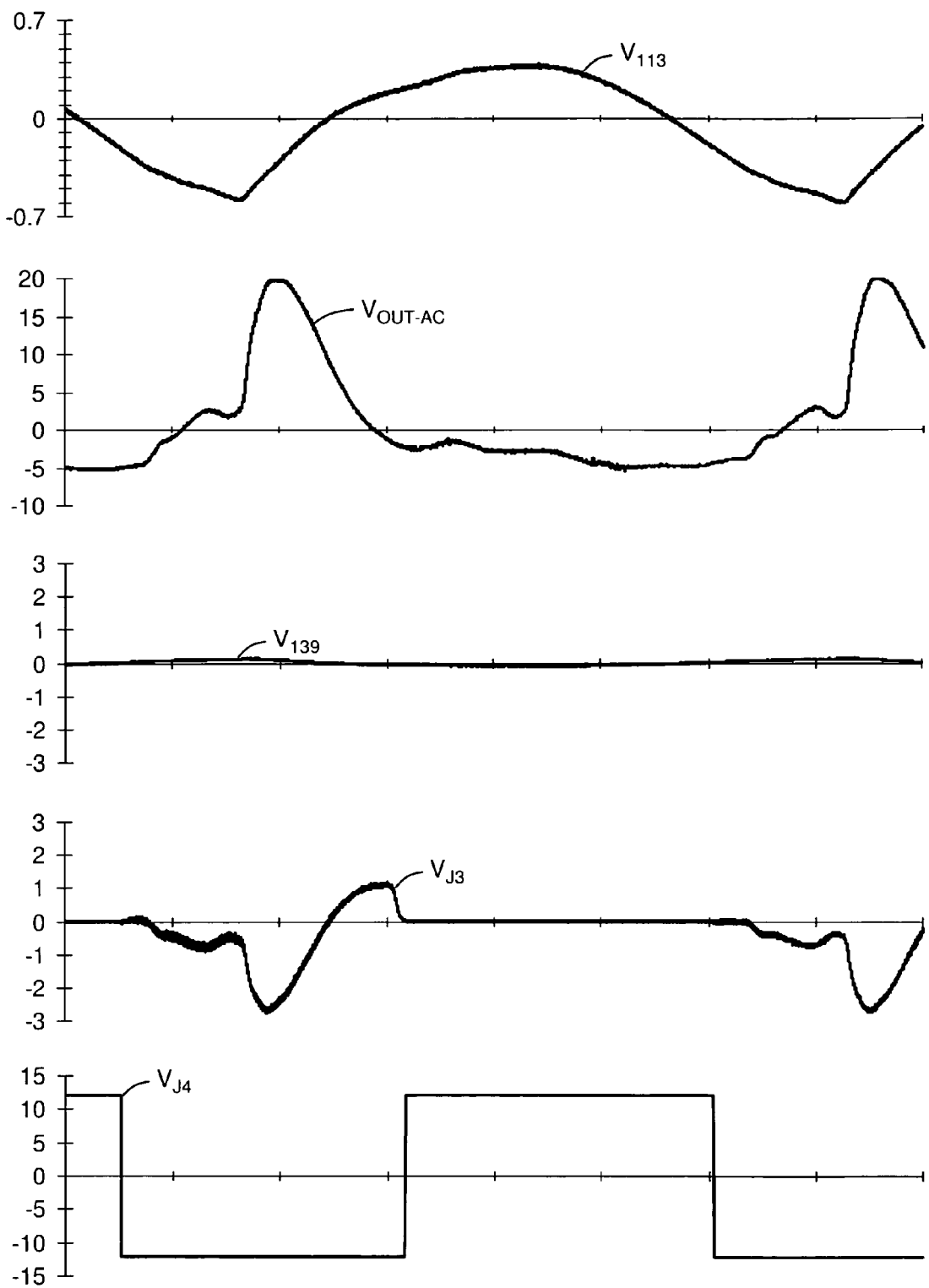
Figure 6:
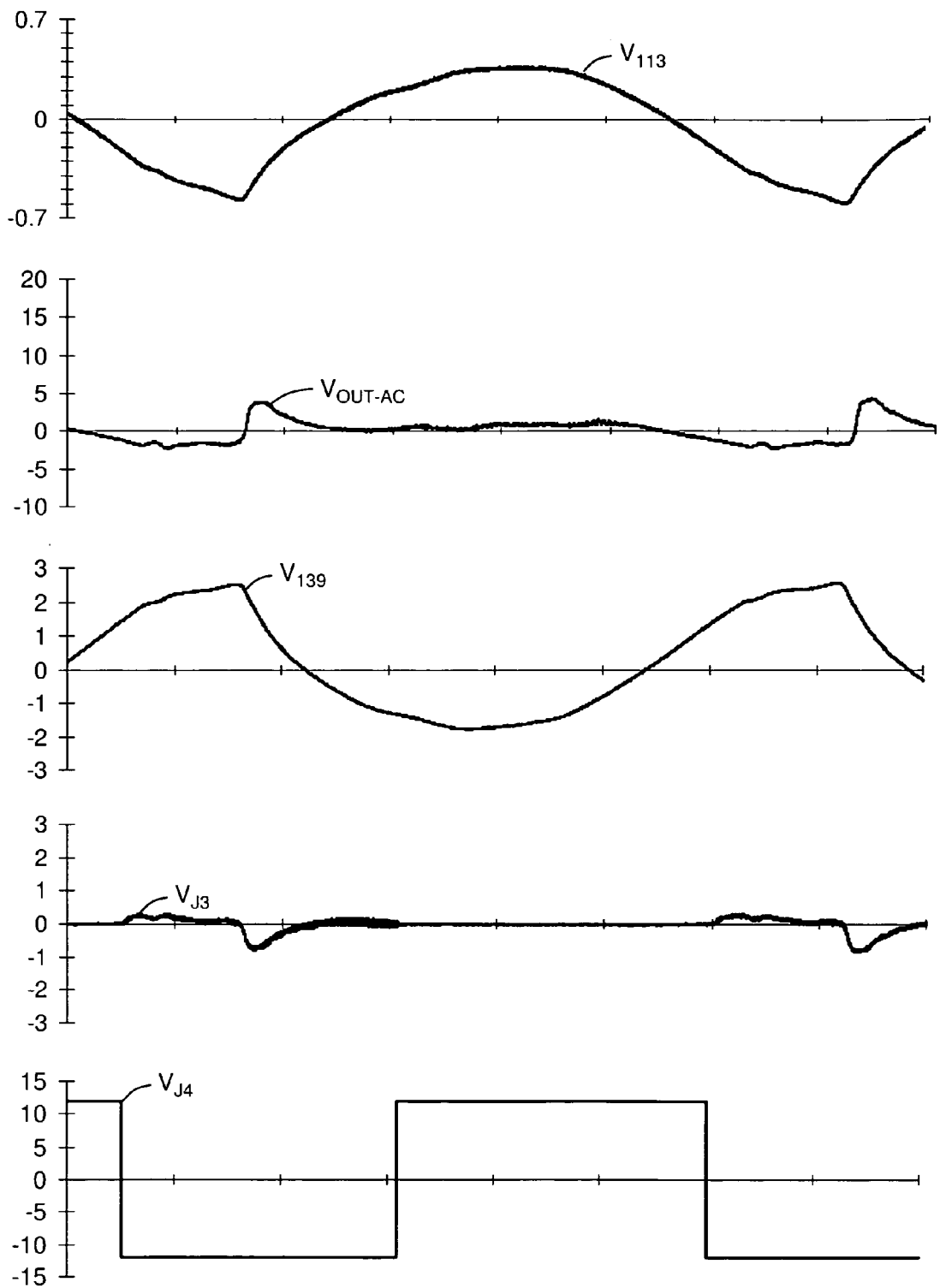

FIG. 5 shows circuit additional waveforms without feedforward (U3 removed), and FIG. 6 shows additional waveforms with feedforward (U3 installed). In these two figures, waveform $V_{113}$ illustrates feedforward measurement signal 113, $V_{J3}$ illustrates the voltage at junction J3, and $V_{J4}$ illustrates the voltage at junction J4. In FIG. 5, $V_{J3}$ shows the gated power signal at J3 when feedforward is disabled by removing U3. The average value of the AC-coupled power signal at J2 is zero, and because the waveform is inverted, the voltage at J2 will be negative during the positive spikes of the power supply DC output voltage. If the voltage at J2 is gated by an interval around the cusps on the DC bus voltage, then the gated signal would have a negative average value. Consequently, the average value of the gated power signal at J3 is negative, and when this voltage is integrated by U7, feedforward scaling signal 148 becomes positive. If too much feedforward compensation were applied, then the average value of the voltage at J3 would be positive, and this would drive feedforward scaling signal 148 toward zero. The negative power pin of U7 is tied to ground. FIG. 6 shows the waveforms of FIG. 5 when U3 is installed and the adaptive feedforward circuit is operating.

In addition to reducing the output ripple of a DC power supply, the adaptive feedforward circuit could also be applied to reduce the ripple in the envelope of RF power supplies that are powered from an unfiltered three-phase rectified DC bus. The adaptive feedforward circuit can be utilized in applications other than power supplies intended for plasma processing. In general, power supply 30 can be any type of controllable plant that operates a load 43. The output measurements can correspond to any relevant output parameters of the plant.

Although herein there is illustrated and described specific structure and details of operation of the invention, it is clearly understood that the same were merely for purposes of illustration and that changes and modifications may be readily made therein by those skilled in the art without departing from the spirit and the scope of this invention.

I claim:

1. A power supply system comprising:
   (a) a source of DC power that provides a DC bus voltage between a pair of DC bus terminals;

(b) a power supply that receives power from the DC bus terminals and delivers power to a load;
(c) an output measurement circuit that measures at least one output parameter delivered by the power supply output to the load;
(d) a feedback regulator connected to the output measurement circuit that receives feedback from the output measurement circuit corresponding to the at least one output parameter and provides a feedback output signal operative to regulate the output of the power supply to achieve a desired voltage, current, or power level specified by a setpoint signal; and
(e) an adaptive feedforward circuit connected to the feedback regulator and to the DC bus terminals to provide a combined regulation signal to the power supply that minimizes perturbations in the output of the power supply due to DC bus ripple voltage, wherein the adaptive feedforward circuit is comprised of a feedforward measurement circuit connected to the DC bus terminals to provide a feedforward measurement signal to a feedforward scaling amplifier, a feedforward scaling regulator that receives the feedforward measurement signal and feedback output signal and provides a feedforward scaling signal to the feedforward scaling amplifier that is proportional to the product of the feedforward measurement signal and a scaling factor, wherein the feedforward scaling regulator is comprised of a gating circuit that periodically applies a signal derived from the feedback signals to an integrator circuit that generates the feedforward scaling signal synchronized to the periodic ripple in the DC bus voltage; and
(f) a signal combiner connected to the feedforward scaling amplifier and feedback regulator to produce the combined regulation signal that is delivered to the power supply.

2. A power supply system comprising:
(a) a source of DC power that provides a DC bus voltage between a pair of DC bus terminals, the DC bus voltage having a periodic DC bus ripple voltage;
(b) a power supply that receives power from the DC bus terminals and delivers power to a load, the power supply having a control signal input;
(c) an output measurement circuit that measures at least one output parameter delivered by the power supply output to the load, the at least one output parameter selected from the group consisting of voltage, current and power;
(d) a feedback regulator having a first feedback input that receives feedback from the output measurement circuit corresponding to the at least one output parameter, and provides a feedback output signal operative to regulate the output of the power supply to achieve a desired voltage, current, or power level specified by a setpoint signal;
(e) an adaptive feedforward circuit that has a feedforward measurement circuit, a feedforward scaling amplifier, a feedforward scaling regulator, and a signal combiner;
(f) the feedforward measurement circuit having input terminals connected to the DC bus terminals and providing a feedforward measurement signal;
(g) the feedforward scaling amplifier having a feedforward input that receives the feedforward measurement signal and provides a scaled feedforward signal that is proportional to the product of the feedforward measurement signal and a scaling factor signal present at a scaling input;
(h) the feedforward scaling regulator having a sync input that receives the feedforward measurement signal, a second feedback input that receives feedback from the output measurement circuit, the feedforward scaling regulator, providing a feedforward scaling signal to a level that minimizes perturbations in the output of the power supply due to the DC bus ripple voltage;
(i) the feedforward scaling regulator further comprising a gating circuit that periodically applies a signal derived from the at least a portion of the feedback to an integrator circuit that generates the feedforward scaling signal;
(j) the signal combiner receiving the feedback output signal and the scaled feedforward signal and producing a combined regulation signal that is delivered to the control signal input of the power supply.

* * * * *